US007042164B2

(12) United States Patent
Yazawa

(10) Patent No.: US 7,042,164 B2
(45) Date of Patent: May 9, 2006

(54) SELF LIGHT EMITTING DISPLAY DEVICE

(75) Inventor: Naoki Yazawa, Yonezawa (JP)

(73) Assignee: Tohoku Pioneer Corporation, Yamagata (JP)

( * ) Notice: Subject to any disclaimer, the term of this patent is extended or adjusted under 35 U.S.C. 154(b) by 0 days.

(21) Appl. No.: 10/983,720

(22) Filed: Nov. 9, 2004

(65) Prior Publication Data

US 2005/0116655 A1 Jun. 2, 2005

(30) Foreign Application Priority Data

Nov. 28, 2003 (JP) ............................ 2003-399125

(51) Int. Cl.
*G03B 15/03* (2006.01)

(52) U.S. Cl. .................... 315/169.3; 315/224; 345/211

(58) Field of Classification Search ............ 315/169.3, 315/224, 160; 345/211–212
See application file for complete search history.

(56) References Cited

U.S. PATENT DOCUMENTS

| | | | | |
|---|---|---|---|---|
| 5,841,431 | A | 11/1998 | Simmers | |
| 6,788,003 | B1 * | 9/2004 | Inukai et al. | 315/169.3 |
| 2002/0054036 | A1 | 5/2002 | Johnson et al. | |
| 2003/0197472 | A1 | 10/2003 | Kanauchi et al. | |
| 2004/0183465 | A1 * | 9/2004 | Jang | 315/224 |
| 2005/0052448 | A1 * | 3/2005 | Hayafuji et al. | 345/212 |
| 2005/0078065 | A1 * | 4/2005 | Hayafuji et al. | 345/76 |
| 2005/0110722 | A1 * | 5/2005 | Hayafuji | 345/76 |

FOREIGN PATENT DOCUMENTS

| | | | |
|---|---|---|---|
| EP | 1 056 261 | A2 | 11/2000 |
| EP | 1 056 261 | A3 | 11/2000 |
| JP | 2003-219314 | | 7/2003 |

* cited by examiner

*Primary Examiner*—Trinh Vo Dinh
*Assistant Examiner*—Chuc Tran
(74) *Attorney, Agent, or Firm*—Westerman, Hattori, Daniels & Adrian, L.L.P.

(57) ABSTRACT

In order to realize, at a low cost, the function of an indicator which is brought to a light emitting state during a wait state, a panel 1 as a display section is constituted by self light emitting elements E11–Enm for example by organic EL elements, and organic EL elements which function as the indicator Ei which is brought to the light emitting state during the wait state are also formed on the same panel. Meanwhile, an indicator drive circuit 13 which drives and allows the organic EL elements that function as the indicator Ei to emit light is constructed by one chip IC together with the data driver 2. By forming the indicator drive circuit 13 as one chip IC in a data driver 2, the manufacturing cost can be reduced compared to the case where the indicator drive circuit is prepared separately. The EL elements functioning as the indicator Ei also can be formed on the same substrate as that of the respective EL elements E11–Enm constituting the display section by the same process, thereby contributing to cost reduction.

9 Claims, 6 Drawing Sheets

SELF LIGHT EMITTING DISPLAY DEVICE

BACKGROUND OF THE INVENTION

1. Field of the Invention

The present invention relates to a self light emitting display device which is adopted appropriately in electrical equipment and the like that drives and allows an indicator to emit light in a wait state in which for example a main power supply is brought to an off state.

2. Description of the Related Art

For example, many of household appliances are constructed so that ON/OFF of a main power supply switch can be controlled employing an infrared type remote control device or the like. In this case, when a video reproduction equipment or the like including for example television image receiver, display, and the like is brought to a wait mode, the main power supply switch is brought to an OFF state, and supply of a drive current to main loads (video circuit, voice circuit, and the like) is stopped. Such a wait mode corresponds to a state in which an ON command from the remote control device for the main power supply switch is waited, and minimum circuits such as a remote control signal light-receiving section, a control microprocessor, and the like are in an operation state.

In electrical equipment which can choose the wait mode in which the ON command for example from the remote control device is waited as described above and a normal operation mode in which the ON command from the remote control device is received so that the main power supply switch is in an ON state, specifically an indicator for indicating the state of the wait mode during the wait mode is disposed on the front side of the equipment. For this indicator, for example, an LED, a neon tube, or the like is employed, and there are cases where the luminous color of the indicator which is illuminated during the wait mode is determined depending on a specific nation or region.

FIG. 1 shows its example by a block diagram. In FIG. 1, reference numeral 1 designates a display panel mounted in an electrical device, and this display panel 1 is driven to be lit by a data driver 2 and a scan driver 3. As this display panel 1, a passive matrix type organic EL display panel can be employed as one example, and in this case, the voltage supplied from a main power supply B1 is boosted to a drive voltage VH by a voltage boost circuit 4 and is supplied to the data driver 2.

The drive voltage VH by the voltage boost circuit 4 is series regulated or is regulated in another way to generate a voltage VM, and this voltage VM is supplied to the scan driver 3 so that a reverse bias is given to EL elements which are brought to an non-light-emitting-state in the display panel 1, whereby so-called cross talk light emission can be prevented.

Meanwhile, reference numeral 11 designates a control microprocessor operating by a wait power supply B2, and the control microprocessor 11 is constructed such that control signals can be transmitted from this control microprocessor 11 to the data driver 2 and the scan driver 3 respectively via bus lines. A remote control signal light-receiving section and an indicator drive circuit designated by reference numerals 12 and 13 are also activated by the wait power supply B2, and an indicator 14 for example by an LED connected to the indicator drive circuit 13 is driven to emit light in the wait mode.

While the remote control signal light-receiving section 12 is in a state in which an ON command for a main power supply switch from an unillustrated remote control device is waited in a wait mode, when the command is received, a control signal is sent from the remote control signal light-receiving section 12 to the control microprocessor 11, and the control microprocessor 11 sets the main power supply switch SW to an ON state. Thus, the display panel 1 is brought to a normal operation mode in which a video signal can be displayed. At this time, the control microprocessor 11 sends a control signal to the indicator drive circuit 13 so that control by which the indicator 14 is extinguished is performed.

Disclosed in Japanese Patent Application Laid-Open No. 2003-219314 (for example, paragraph "0004") shown below is that in this type of electrical equipment, a green color light emission LED is driven to emit light during the wait mode, and a red color light emission LED is driven to emit light during the normal operation mode.

Meanwhile, in the above-mentioned conventional electrical equipment, the indicator constituted by an LED or the like which is driven to emit light in the wait mode is constructed so as to be in an independent circuit structure together with the indicator drive circuit which drives and allows the indicator to emit light. Accordingly, in order to construct this circuit, it cannot be avoided that the manufacturing cost inevitably increases. Consumption power by the indicator constituted by an LED or the like which is driven to emit light in the wait mode and by the indicator drive circuit which is for driving the indicator cannot be ignored, and improvement of efficiency in these circuit and the like is also required.

SUMMARY OF THE INVENTION

The present invention has been developed as attention to the above-described technical problems has been paid, and it is an object of the present invention to provide a self light emitting display device in which for example during a wait state in which a main power supply is brought to an OFF state, an indicator which indicates this wait state as its function can be driven by low consumption power at a low cost.

A self light emitting display device according to the present invention which has been developed to solve the problems is provided with a display section by self light emitting elements, an indicator which is brought to a light emitting state during a wait time, a display section light emission drive device for driving and allowing the display section to emit light, and an indicator light emission drive device for driving and allowing the indicator to emit light, characterized in that a self light emitting element constituting the indicator and at least a part of the self light emitting elements constituting the display section are formed on a same substrate and are formed by a same manufacturing process.

DESCRIPTION OF THE PREFERRED EMBODIMENTS

Figure 1:
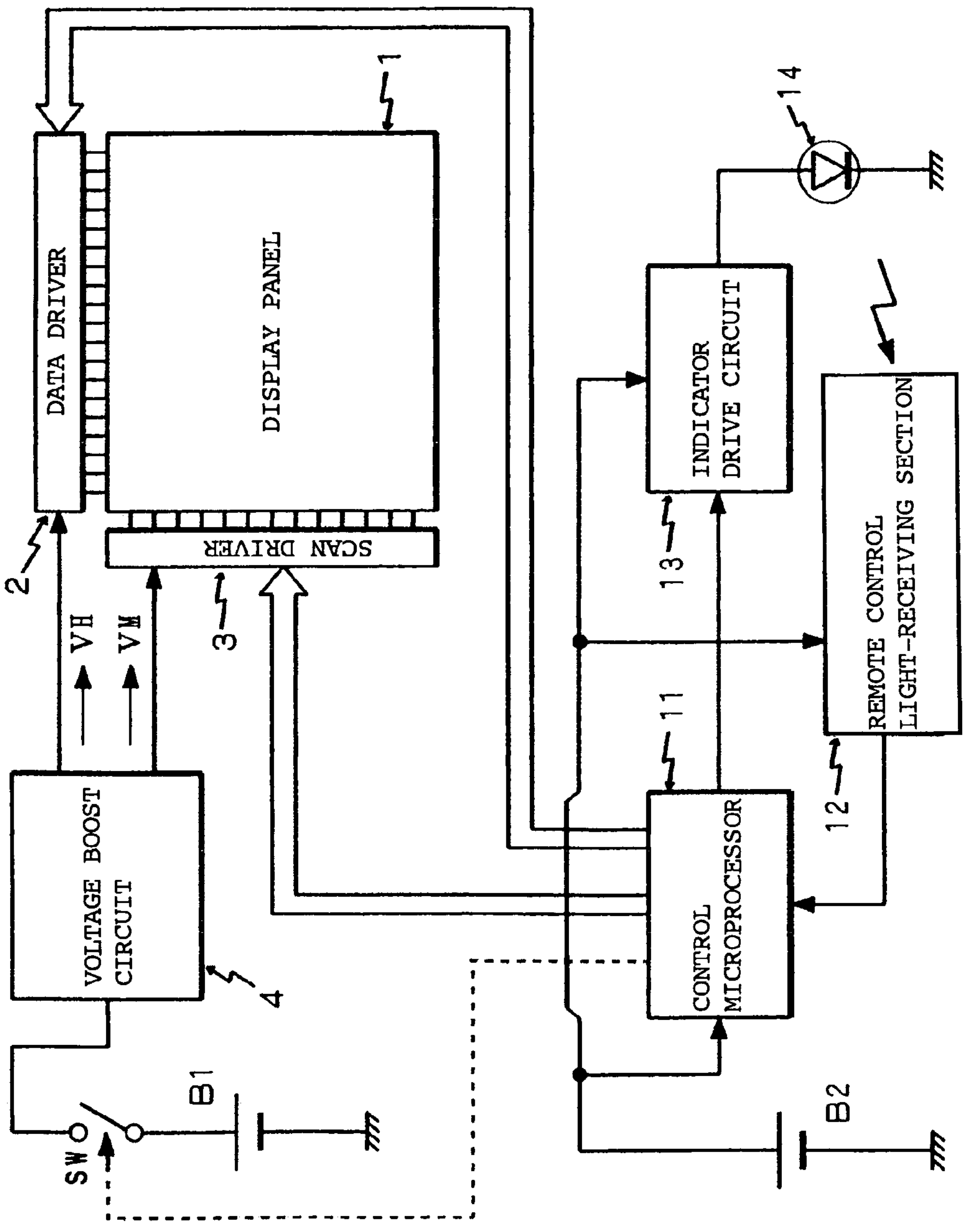
FIG. 1 (Prior Art)
FIG. 1 is a block diagram showing an example of a circuit structure of a conventional electrical equipment which drives and allows an indicator to emit light in a wait mode.

A self light emitting display device according to the present invention will be described below with reference to the embodiments shown in the drawings. In the self light emitting display device described below, described is an example in which an organic EL element in which an organic material is employed in the light emitting layer thereof is adopted as a light emitting element. This organic EL element can be electrically replaced by a structure composed of a light emitting component having a diode characteristic and a parasitic capacitance component which is connected in parallel to this light emitting component, and it can be said that the organic EL element is a capacitive light emitting element.

Regarding the organic EL element, due to reasons that the voltage-intensity characteristic thereof is unstable with respect to temperature changes while the current-intensity characteristic thereof is stable with respect to temperature changes, that when the organic EL element receives excess current, degradation of the organic EL element is considerable so that the light emission lifetime is shortened, and the like, a constant current drive is performed generally. As the display panel employing such organic EL elements, a passive matrix type display panel in which EL elements are arranged in a matrix pattern and an active matrix type display panel in which respective EL elements arranged in a matrix pattern are driven to be lit by respective TFTs (thin film transistors) have been proposed.

Figure 2:
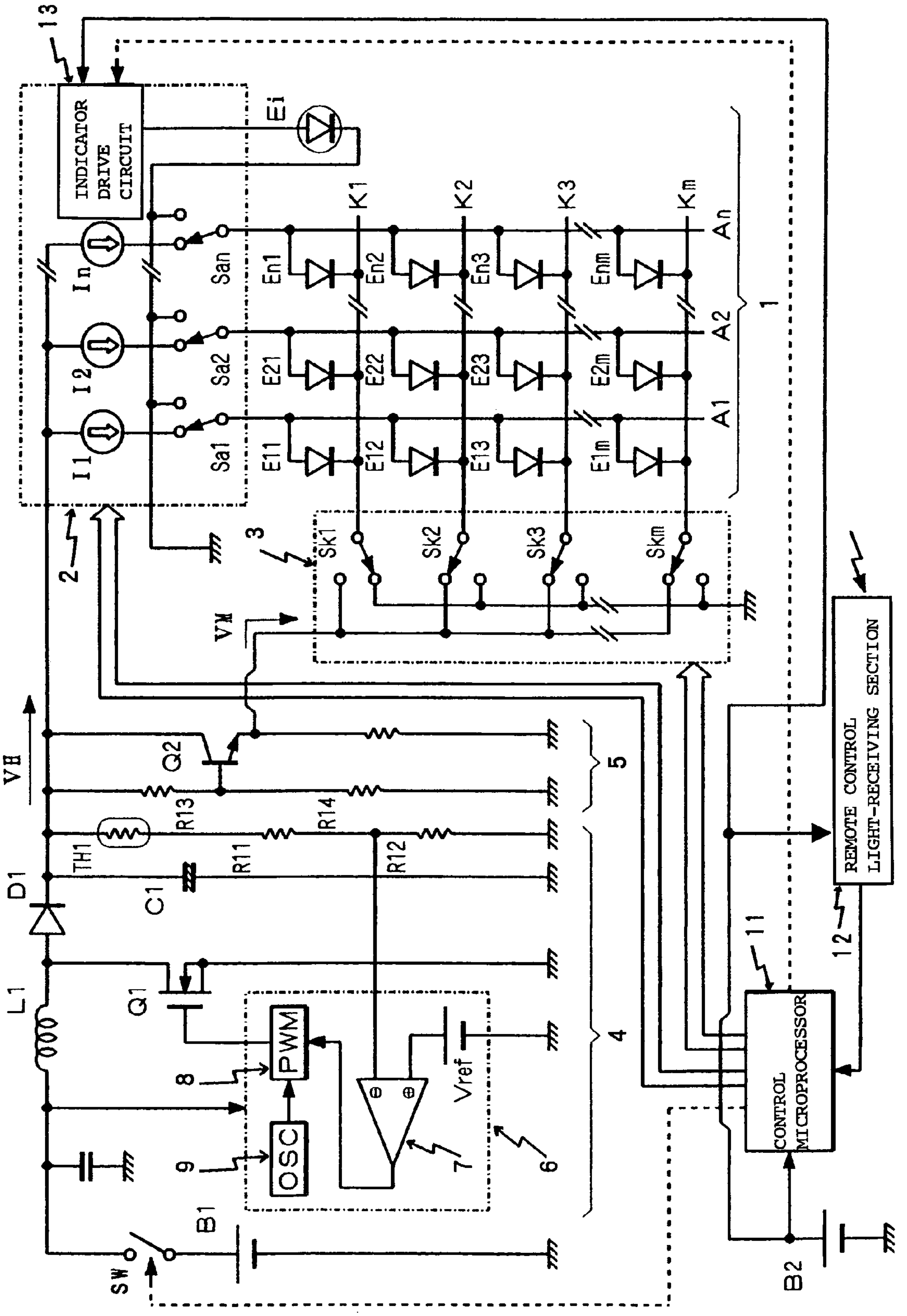
FIG. 2 is a connection diagram showing a first embodiment of a self light emitting display device including a passive matrix type display panel, according to the present invention.

FIG. 2 shows a first embodiment of a self light emitting display device including a passive matrix type display panel, according to the present invention. In drive methods for organic EL elements in this passive matrix drive system, there are two methods, that is, cathode line scan/anode line drive and anode line scan/cathode line drive, and the structure shown in FIG. 2 shows a form of the former cathode line scan/anode line drive. That is, anode lines A1–An as n drive lines are arranged in a vertical direction (column direction), cathode lines K1–Km as m scan lines are arranged in a horizontal direction (row direction), and organic EL elements E11-Enm designated by symbols/marks of diodes are formed at portions at which the anode lines intersect the cathode lines (in total, n×m portions) to construct a display panel 1 as a display section.

In the embodiment shown in this FIG. 2, an organic EL element which functions as an indicator Ei which is brought to a light emission state during a later-described wait mode is also formed on the same substrate constituting the display panel 1. Although the indicator Ei is shown as if it were constituted by one EL element for convenience of illustration, preferably, the indicator is formed of an assembly of several to several-tens EL elements of the degree by which this state can be obviously displayed during the later-described wait mode.

The organic EL elements E11–Enm constituting the display section and organic EL elements constituting the indicator Ei are formed by the same manufacturing processes on the same substrate as described below. That is, the above-mentioned anode lines are formed on a transparent substrate (for example, a glass substrate) in a stripe pattern, utilizing a photolithographic method or the like. Well-known ITO (Indium Tin Oxide) is employed as these anode lines, and a film of the same ITO is formed as anode electrodes of the EL elements over an area in which the pixels by the respective EL elements are formed.

Subsequently, a film of an insulating layer for which for example high molecular weight polyimide or the like is employed as a material is formed on the entire surface except for the area on which the respective pixels are formed, and then scan line partition walls are formed in a stripe pattern in a direction perpendicular to the anode lines. After these scan line partition walls are formed, a film of an organic EL material is formed over the entire surface including the area on which the pixels by the above-mentioned ITO are formed. Then, a metal thin film made of an aluminum material or the like constituting the cathodes is formed for example by resistance heating deposition method.

Although this metal thin film is also formed over the entire surface, this metal thin film is electrically separated in the direction of the thickness of the surface by the existence of the scan line partition walls formed in the stripe pattern. As a result, the metal thin film functions as the cathode side electrodes of the pixels formed by film formation of the organic EL material, and is formed as the cathode lines which are mutually insulated by the scan line partition walls.

As a result, in the respective EL elements E11–Enm constituting the pixels, one ends thereof (anode terminals in equivalent diodes of EL elements) are connected to the anode lines and the other ends thereof (cathode terminals in the equivalent diodes of EL elements) are connected to the cathode lines, corresponding to respective intersection positions between the anode lines A1–An extending along the vertical direction and the cathode lines K1–Km extending along the horizontal direction, as shown in FIG. 2.

The respective anode lines A1–An in the display panel 1 formed by the above-described manufacturing processes are connected to an anode line drive circuit 2 provided as a data driver constituting a display section light emission drive device, and the respective cathode lines K1–Km are connected to a cathode line scan circuit 3 provided as a scan driver which similarly constitutes the display section light emission drive device, so that the respective anode and cathode lines A1–An and K1–Km are driven thereby.

The anode line drive circuit 2 is provided with constant current sources I1–In which are activated utilizing a drive voltage VH supplied from a voltage boost circuit 4 in a later-described DC-DC converter and drive switches Sa1-San, and the drive switches Sa1-San are connected to the constant current sources I1–In side so that current from the constant current sources I1–In is supplied to the respective EL elements E11–Enm arranged corresponding to the cathode lines. Further, in this embodiment, when the current from the constant current sources I1–In is not supplied to the respective EL elements, the drive switches Sa1–San can allow the respective anode lines to be connected to a ground side provided as a reference potential point.

The cathode line scan circuit 3 is equipped with scan switches Sk1–Skm corresponding to the respective cathode lines K1–Km, and these scan switches operate to allow either a reverse bias voltage VM provided from a later-described reverse bias voltage generation circuit 5 for mainly preventing cross talk light emission or the ground potential provided as the reference potential point to be connected to corresponding cathode lines. Thus, the constant current sources I1–In are connected to desired anode lines A1–An while the cathode lines are set at the reference potential point (ground potential) at predetermined cycles, so that the respective EL elements can be selectively illuminated.

Meanwhile, the DC-DC converter is constructed to utilize PWM (pulse width modulation) control as the voltage boost circuit 4 and to generate the drive voltage VH of direct current in the example shown in FIG. 2. This DC-DC converter also can utilize well-known PFM (pulse frequency modulation) control or PSM (pulse skip modulation) control instead of the PWM control.

This DC-DC converter is constructed such that PWM wave outputted from a switching regulator 6 constituting a part of the voltage boost circuit 4 gives ON control to a MOS type power FET Q1 provided as a switching element at a predefined duty cycle. That is, by ON operation of the power FET Q1, electrical energy from the main power supply B1 constituting the primary side is accumulated in an inductor L1, and the electrical energy accumulated in the inductor L1 accompanied by OFF operation of the power FET Q1 is accumulated in a capacitor C1 via a diode D1. By repeats of ON and OFF operations of the power FET Q1, a boosted DC output can be obtained as a terminal voltage of the capacitor C1.

The DC output voltage is divided by a thermistor TH1 performing temperature compensation and resistances R11 and R12, is supplied to an error amplifier 7 in the switching regulator 6, and is compared to a reference voltage Vref in this error amplifier 7. This comparison output (error output) is supplied to the PWM circuit 8, and by controlling the duty of a signal wave provided from an oscillator 9, the output voltage is feedback controlled so as to be maintained at a predetermined drive voltage VH. Therefore, the output voltage by the DC-DC converter, that is, the drive voltage VH, can be shown as the following Equation 1:

$$VH = V\mathrm{ref} \times [(TH1 + R11 + R12)/R12] \quad \text{(Equation 1)}$$

Meanwhile, the reverse bias voltage generation circuit 5 utilized for preventing the cross talk light emission is constructed by a voltage divider circuit dividing the drive voltage VH. That is, this voltage divider circuit is composed of resistances R13 and R14 and an npn transistor Q2 functioning as an emitter follower, so that the reverse bias voltage VM is obtained at the emitter of the transistor Q2. Therefore, where the base-emitter voltage of the transistor Q2 is denoted by Vbe, the reverse bias voltage VM obtained by the voltage divider circuit can be shown as the following Equation 2:

$$VM = VH \times [R14/(R13 + R14)] - Vbe \quad \text{(Equation 2)}$$

Control buses are connected from a control microprocessor 11 including a CPU to the anode line drive circuit 2 and the cathode line scan circuit 3. Based on a video signal to be displayed, the scan switches Sk1–Skm and the drive switches Sa1–San are operated. Thus, while the cathode scan lines are set at the ground potential at predetermined cycles based on the video signal, the constant current sources I1–In are connected to desired anode lines. Accordingly, the respective light emitting elements selectively emit light, and an image based on the video signal is displayed on the display panel 1.

The first cathode line K1 is set to the ground potential so that the state shown in FIG. 2 is brought to a scan state, and at this time the reverse bias voltage VM from the reverse bias voltage generation circuit 5 is applied to the cathode lines K2–Km of a non-scan state. Accordingly, respective EL elements connected to intersection points between driven anode lines and cathode lines which are not selected for scanning are prevented from emitting cross talk light.

In the embodiment shown in FIG. 2, the control microprocessor 11 is activated by a wait power supply B2, and a remote control signal light-receiving section designated by reference numeral 12 is also activated by the wait power supply B2. In the state of the wait mode shown in FIG. 2, the remote control signal light-receiving section 12 is brought to the wait mode in which an ON command for a main power supply switch from an unillustrated remote control device is waited.

When the remote control signal light-receiving section 12 receives the command, a control signal is sent from the remote control signal light-receiving section 12 to the control microprocessor 11, and the control microprocessor 11 allows a switch SW of the main power supply B1 to be in an ON state via a system ON/OFF port which is shown by a broken line. Thus, driving power is supplied to the anode line drive circuit 2 and the cathode line scan circuit 3 which function as the display section light emission drive device, and the display panel 1 is brought to a normal operation mode in which the video signal can be displayed.

Meanwhile, a command signal can be supplied from the control microprocessor 11 to an indicator light emission drive device, that is, an indicator drive circuit 13 formed in the anode line drive circuit 2 via a control port shown by a broken line. This indicator drive circuit 13 is activated by the wait power supply B2, and in the wait mode, a drive current is supplied to the EL elements which function as the indicator Ei formed in the display panel 1 to control the indicator Ei so that the indicator Ei is in a light emission state. When the indicator drive circuit 13 is brought to the normal operation mode, the indicator Ei is extinguished.

In the embodiment shown in FIG. 2, the indicator drive circuit 13 is formed in the anode line drive circuit 2. In this case, since the constant current sources I1–In, the drive switches Sa1–San, and the like in the anode line drive circuit 2 can be constructed by one chip IC, and since even the indicator drive circuit 13 can be constructed mainly by an analog switch, they can be made in the substrate of the one chip IC by the same manufacturing processes. In short, in this embodiment, the indicator drive circuit 13 is formed as a part of the anode line drive circuit 2 as one chip IC.

There is a case where this one chip IC constituting the anode line drive circuit 2 and the indicator drive circuit 13 is formed on a so-called silicon substrate which is independent of the display panel 1, and this one chip IC may also be formed for example on a glass substrate used in common with the display panel 1. In the structure shown in FIG. 2, although the cathode electrode of the EL element which functions as the indicator Ei is connected to a ground line in the anode line drive circuit 2, this cathode electrode may be connected for example to a ground line in the cathode line scan circuit 3.

With the embodiment shown in FIG. 2, since the indicator drive circuit 13 can be formed for example as one chip IC in the anode line drive circuit 2, the manufacturing cost can be reduced compared to the case where an indicator drive circuit is prepared separately. Further, the EL element which functions as the indicator Ei can also be formed through the same process on the same substrate as that of the respective EL elements E11–Enm constituting the display section, thereby contributing to cost reduction. Moreover, by constituting the light emitting element which functions as the indicator Ei by an organic EL element as in the embodiment shown in FIG. 2, high light emission efficiency that the organic EL element has can be produced as it is. Therefore, the function of the indicator which informs of the wait state can be realized with low consumption power.

Figure 3:
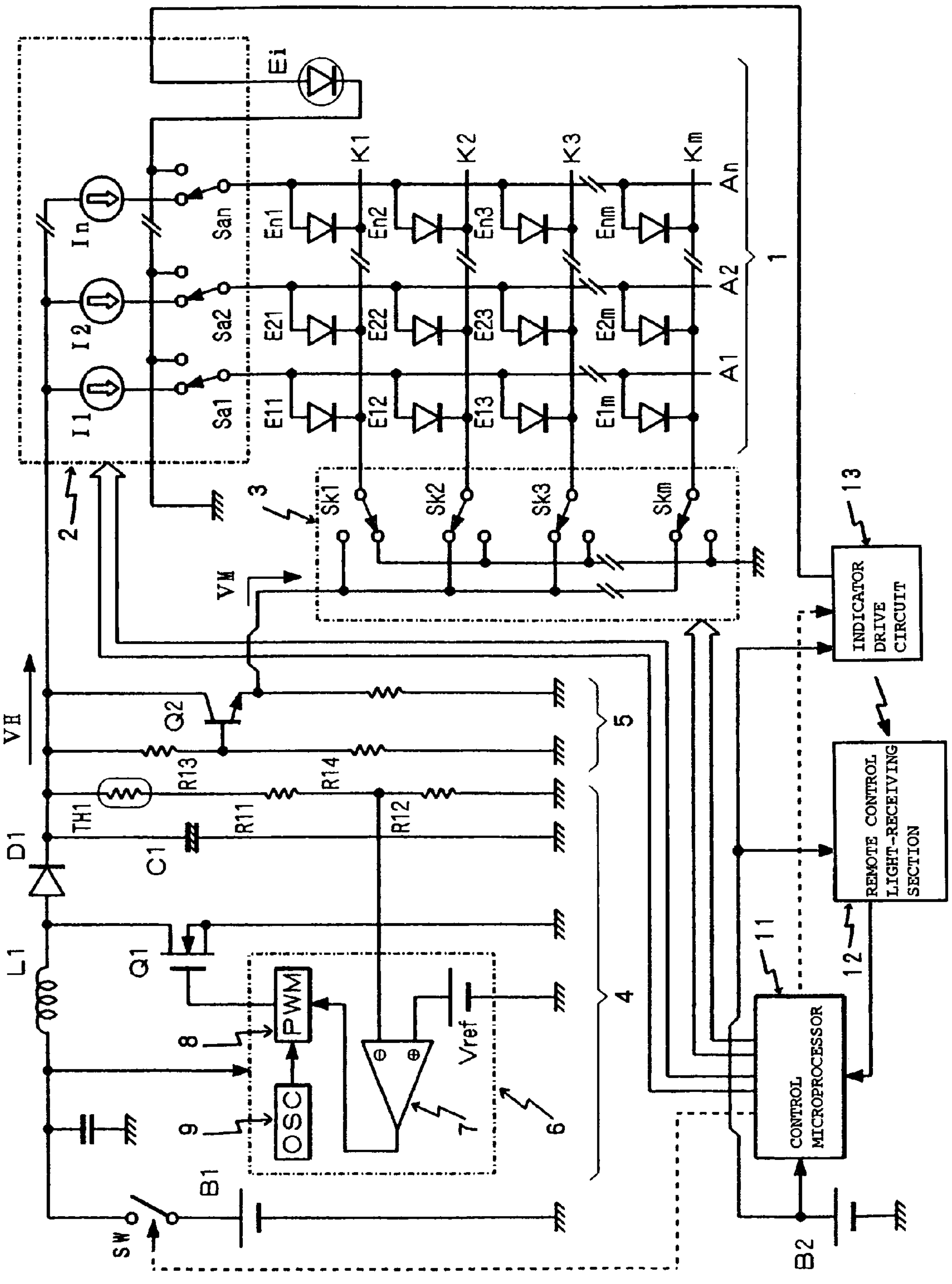
FIG. 3 similarly is a connection diagram showing a second embodiment.

FIG. 3 shows a second embodiment of a self light emitting display device including a passive matrix type display panel, according to the present invention. In the embodiment shown in this FIG. 3, the indicator drive circuit 13 is constituted by an IC chip which differs from that of the anode line drive circuit 2 so as to be constructed such that the indicator drive circuit 13 can be operated independently of the anode line drive circuit, and other structures are the same as those of the embodiment shown in FIG. 2. Therefore, the same functional parts are designated by the same reference numerals or characters, and explanation thereof will be omitted.

In the embodiment shown in this FIG. 3, the EL element which functions as the indicator Ei can be formed by the same processes on the same substrate as that of the respective EL elements E11–Enm constituting the display section, thereby contributing to cost reduction. By constituting the light emitting element functioning as the indicator Ei by the organic EL element, the function of the indicator which informs of the wait state can be realized with low consumption power.

Figure 4:
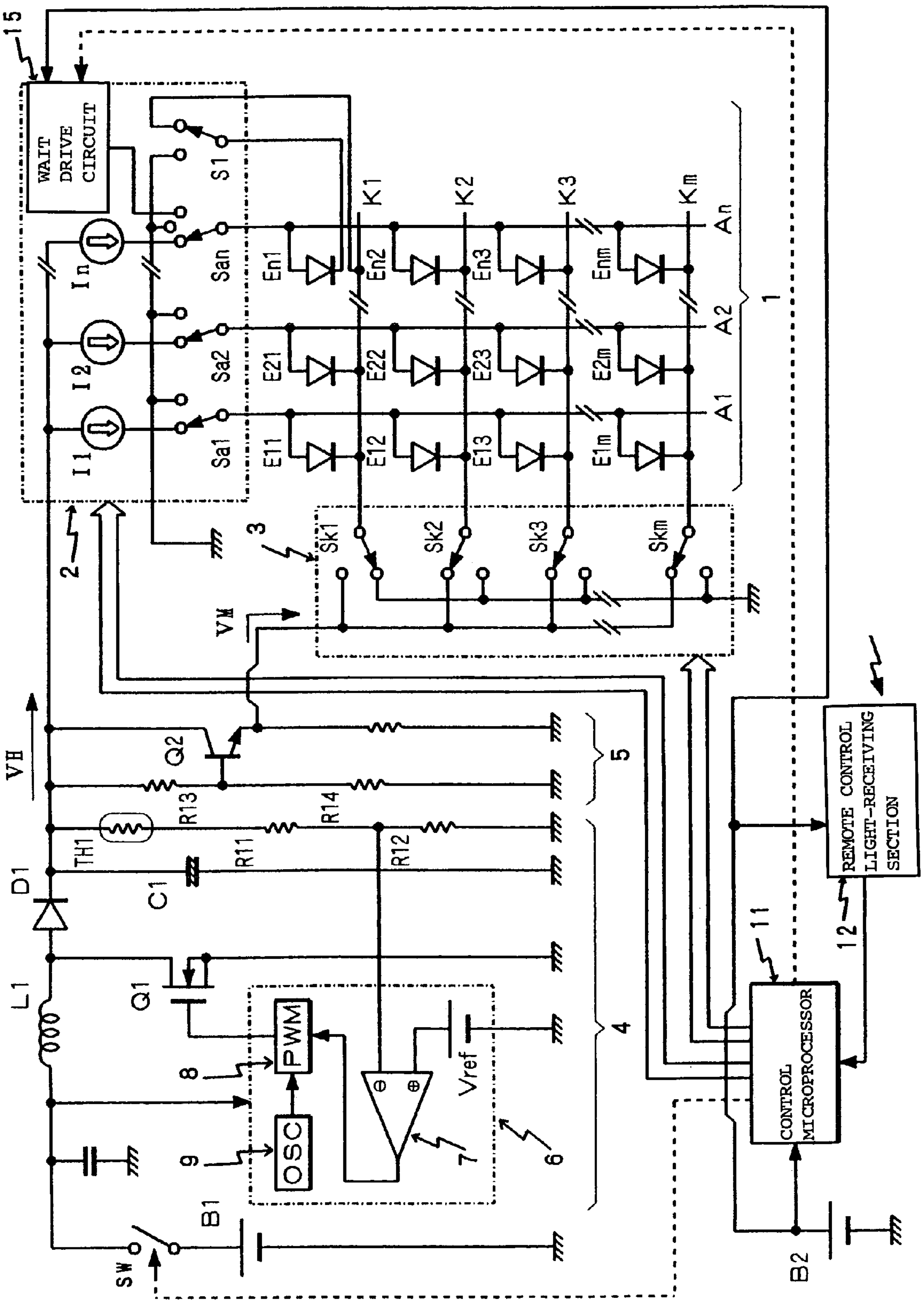
FIG. 4 similarly is a connection diagram showing a third embodiment.

FIG. 4 shows a third embodiment of a self light emitting display device including a passive matrix type display panel, according to the present invention. In the embodiment shown in this FIG. 3, the EL element constituting the indicator is used both as the indicator and a part of the EL elements constituting the display section. In the embodiment shown in this FIG. 4 also, its basic structure is the same as that of the embodiment shown in FIG. 2, therefore the same functional parts are designated by the same reference numerals or characters, and explanation thereof will be omitted.

In the embodiment shown in FIG. 4, En1 that is a display EL element arranged in the display panel 1 is constructed so as to be utilized as an EL element constituting the indicator. Although the structure shown in FIG. 4 is illustrated such that only the EL element En1 is used both as the indicator and the display EL element, preferably, this is constituted by an assembly of several to several-tens EL elements of the degree by which they can be displayed as the indicator.

In order to use display EL elements both as the indicator and the display EL elements, a switch S1 for driving and allowing the indicator to emit light is provided in addition to the drive switches Sa1–San in the anode line drive circuit 2. The drive switches Sa1–San and the indicator light emission drive switch S1 shown in FIG. 4 show a state in which the normal operation mode is selected, that is, a state in which the display panel 1 is driven to emit light.

In this structure, in the case of the wait mode, the drive switch San is switched to the side of a wait drive circuit 15 which functions as the indicator light emission drive device, and the indicator light emission drive switch S1 is switched to a state opposite to that shown in the drawing. Therefore, the drive current outputted from the wait drive circuit 15 during the wait mode flows tracing a path through the drive switch San, the EL element En1 functioning as the indicator, the indicator light emission drive switch S1, and to the ground provided as the reference potential point, and the EL element En1 is allowed to emit light. Therefore, in the embodiment shown in this FIG. 4 also, operations and effects similar to those of the embodiment shown in FIG. 2 can be obtained.

Figure 5:
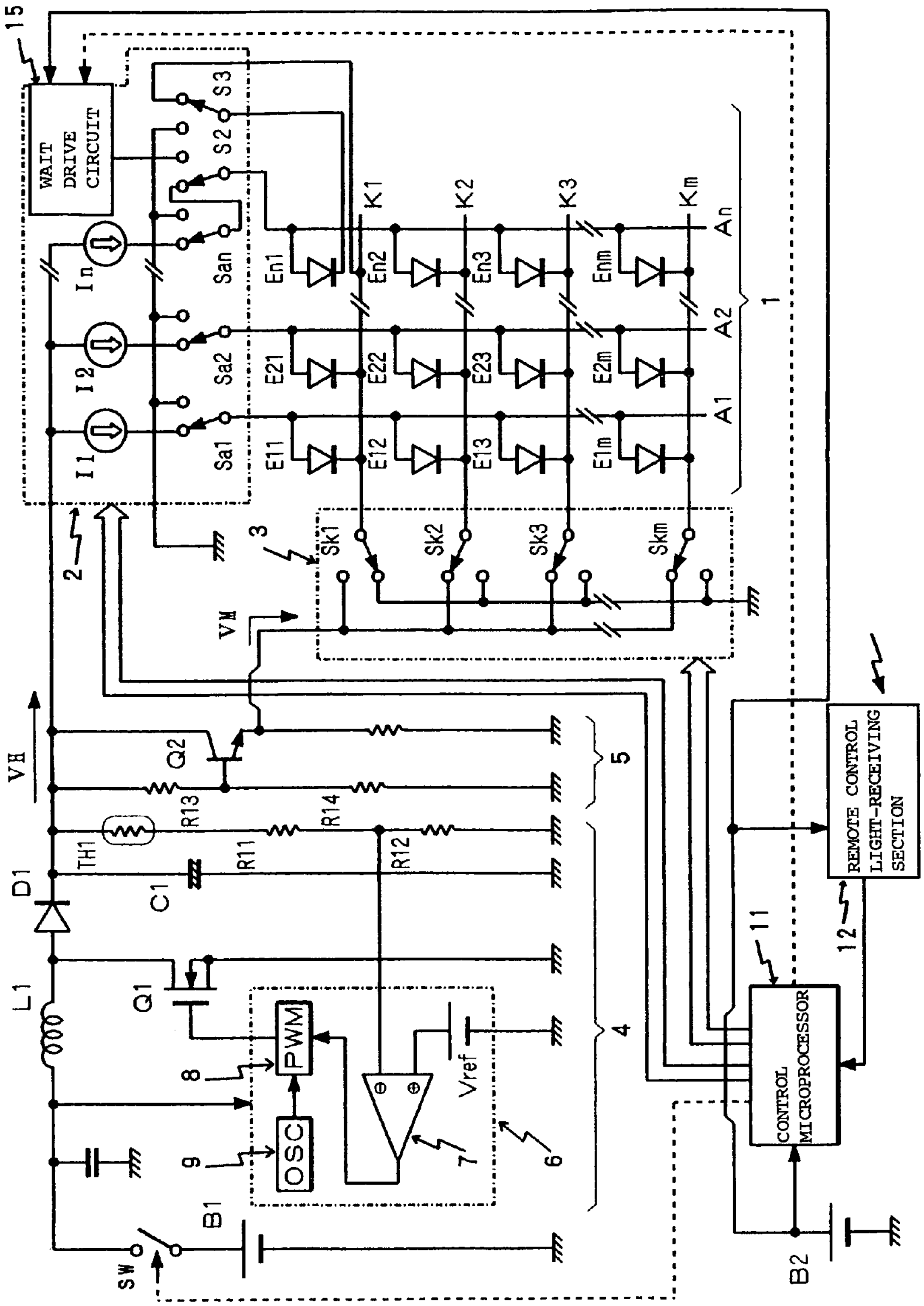
FIG. 5 similarly is a connection diagram showing a fourth embodiment.

FIG. 5 shows a fourth embodiment of a self light emitting display device including a passive matrix type display panel, according to the present invention. In the embodiment shown in this FIG. 5, En1 that is a display EL element arranged in the display panel 1 is constructed so as to be utilized as an EL element constituting the indicator, similarly to the embodiment shown in FIG. 4. In the embodiment shown in this FIG. 5 also, its basic structure is the same as that of the embodiment shown in FIG. 2, therefore the same functional parts are designated by the same reference numerals or characters, and explanation thereof will be omitted.

With the embodiment shown in this FIG. 5, in order to use a display EL element both as the indicator and a display EL element, switches S2, S3 for driving and allowing the indicator to emit light are provided in addition to the drive switches Sa1–San in the anode line drive circuit 2. The drive switches Sa1–San and the indicator light emission drive switches S2, S3 shown in FIG. 5 show a state in which the normal operation mode is selected, that is, a state in which the display panel 1 is driven to emit light.

In this structure, in the case of the wait mode, the indicator light emission drive switches S2, S3 are switched to a state opposite to that shown in the drawing. Therefore, the drive current outputted from the wait drive circuit 15 during the wait mode flows tracing a path through the switch S2, the EL element En1 functioning as the indicator, the switch S3, and to the ground provided as the reference potential point, and the EL element En1 is allowed to emit light.

Therefore, in the embodiment shown in this FIG. 5 also, operations and effects similar to those of the embodiment shown in FIG. 2 can be obtained. In the embodiment shown in this FIG. 5, although there is a need to dispose the indicator light emission drive switches S2, S3, the drive switch San need not specifically be a three-terminal select switch as shown in FIG. 4, whereby the structure can be simplified.

Figure 6:
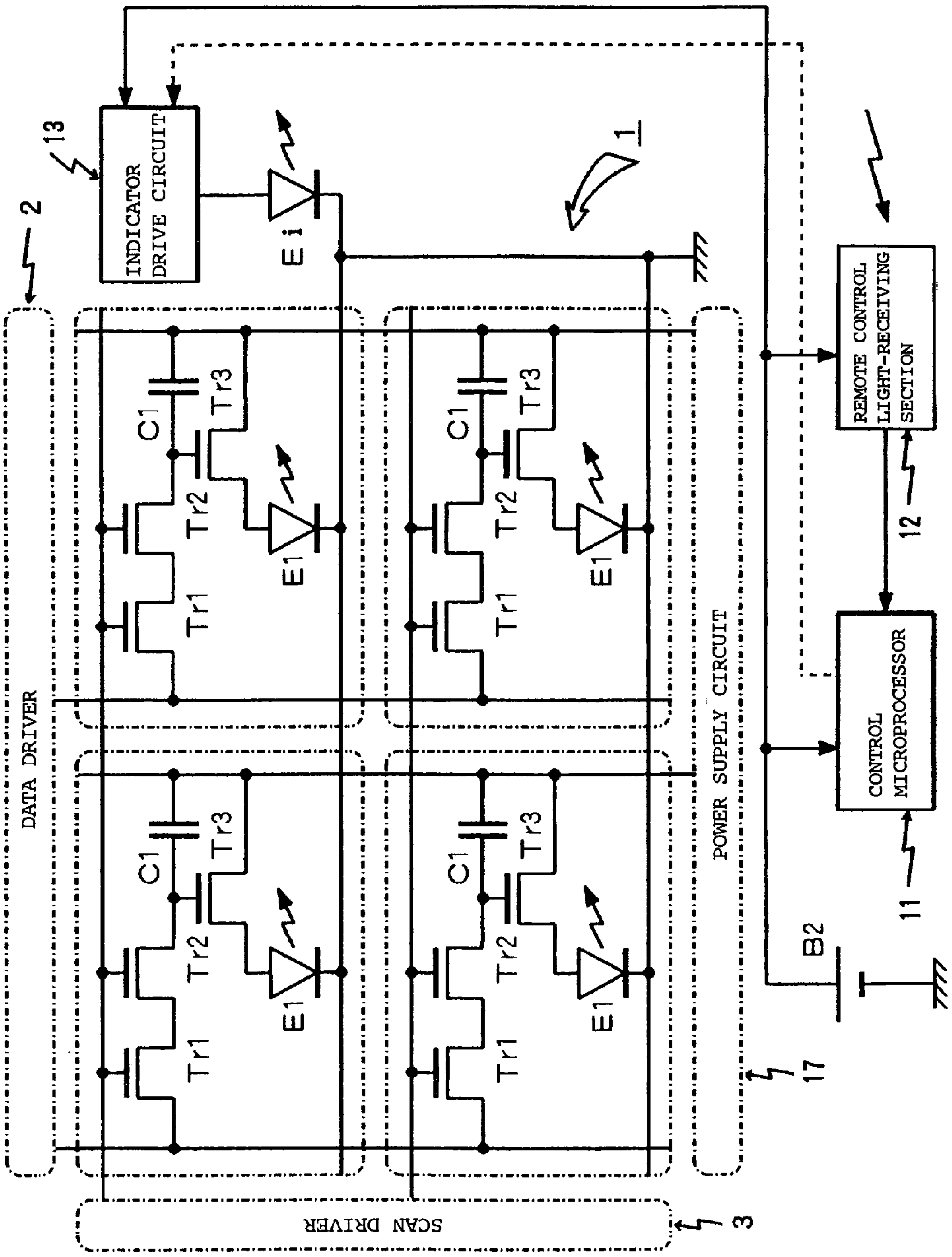
FIG. 6 is a connection diagram showing a fifth embodiment of a self light emitting display device including an active matrix type display panel, according to the present invention.

FIG. 6 shows a fifth embodiment of a self light emitting display device including an active matrix type display panel, according to the present invention. In a display panel 1 constituting a display section in the embodiment shown in this FIG. 6, a large number of data electrode lines to which respective data signals corresponding to video data provided from the data driver 2 are supplied are arranged in the column direction, and a large number of electrical power supply lines which supply operational power supply provided from a power supply circuit 17 to respective pixels are arranged in parallel with the data electrode lines. Meanwhile, a large number of scan electrode lines to which a scan signal provided from the scan driver 3 is supplied are arranged in the row direction, and a large number of ground lines that are at the reference potential point are also arranged in parallel with the scan electrode lines.

In a circuit structure including EL element E1 which corresponds to a unit light emitting pixel, control TFTs, a drive TFT, and a capacitor are provided. In the form shown in FIG. 6, first and second transistors Tr1, Tr2 are employed as the control TFTs, and the scan signal for scanning lines is sequentially given from the scan driver 3 to respective gates thereof via the scan electrode lines.

In this embodiment, sources and drains of the first and second control transistors Tr1, Tr2 are connected in series. The source of the first control transistor Tr1 is connected to the data electrode lines, and the drain of the second control transistor Tr2 is connected to the gate of the drive transistor Tr3 and to one terminal of the capacitor C1.

The other terminal of the capacitor C1 and the source of the drive transistor Tr3 are connected to the power supply line, and the drain of the drive transistor Tr3 is connected to the anode terminal of the EL element E1. The cathode terminal of the EL element E1 is connected to the ground line. Although a structure corresponding to four pixels are illustrated for convenience of illustration in FIG. 6, the above-described pixel structure are respectively constructed similarly, corresponding to the respective organic EL elements E1 arranged in the display panel 1.

In light emission control operations of a unit pixel of the display panel 1 in which such circuits are arranged in the row and column directions, an ON voltage is supplied from the scan driver 3 to the gates of the first and second control transistors Tr1, Tr2 via the scan electrode lines during the address period. In the meantime, a data signal corresponding to video data is supplied from the data driver 2 to the sources of the control transistors Tr1 of the scan state via the data electrode lines.

Thus, current corresponding to the video data signal is allowed to flow in the capacitors C1 via the respective sources and drains of the transistors Tr1, Tr2 which are connected in series, and by this the capacitors C1 are charged. The charge voltage thereof is supplied to the gate of the drive transistor Tr3, and the transistor Tr3 allows current corresponding to the gate voltage thereof to flow in the organic EL element E1, whereby the EL element E1 emits light.

When the gate voltage of the control transistors Tr1, Tr2 becomes an OFF voltage, the transistors Tr1, Tr2 become so-called cutoff. However, the gate voltage of the drive transistor Tr3 is maintained by electrical charges accumulated in the capacitor C1. The drive current to the organic EL element E1 by the drive transistor Tr3 is maintained until a next addressing time, whereby light emission of the EL element E1 is also maintained.

In the light emitting display panel 1 shown in FIG. 6, in addition to the TFTs and the EL elements constituting respective pixels as the display section, an organic EL element functioning as the indicator Ei is also formed on the same substrate constituting the display panel 1. Although the indicator Ei is shown as if it were constituted by one EL element for convenience of illustration, preferably, the indicator is formed of an assembly of several to several-tens EL elements of the degree by which this state can be obviously displayed during the wait mode.

The respective EL elements E1 constituting the display section and the EL element constituting the indicator Ei are formed by the same manufacturing processes for example on a glass substrate. Summary of this manufacturing processes is the same as that described in the explanation of the embodiment shown in FIG. 2.

Meanwhile, the EL element constituting the indicator Ei is constructed so as to be driven to emit light by the drive current supplied by the indicator light emission drive device, that is, the indicator drive circuit 13 during the wait mode. The indicator drive circuit 13 is constructed so as to be activated by the wait power supply B2, together with the control microprocessor 11 and the remote control signal light-receiving section 12, and these respective functions and operations are the same as those described with reference to FIG. 2.

Although not shown in FIG. 6, the control microprocessor 11 allows the main power supply switch SW to be in the OFF state during the wait mode, and the main power supply switch SW is brought to the ON state during the normal operation mode so that the data driver 2, the scan driver 3, and the power supply circuit 17 are brought to the operation state as described with reference to FIG. 2.

With the embodiment shown in FIG. 6, the EL elements functioning as the indicator Ei can be formed on the same substrate as that of the respective EL elements E1 constituting the display section by the same processes, and therefore the manufacturing cost can be reduced compared to the structure of a conventional indicator employing an LED and the like.

Although the indicator drive circuit 13 is shown in a state in which the circuit 13 is constituted by an IC chip which is different from that of the data driver 2 in the embodiment shown in FIG. 6, this indicator drive circuit 13 can be formed as one chip IC for example in the data driver 2 as described with reference to FIG. 2. In this case, it becomes possible to reduce the manufacturing cost, compared to the case where the indicator drive circuit is prepared separately.

In the embodiments described above, although the examples are shown which respectively utilize organic EL elements as self light emitting elements that constitute display pixels and self light emitting elements that constitute the indicator, of course, self light emitting type elements other than organic EL elements can be utilized as the self light emitting elements.

What is claimed is:

1. A self light emitting display device provided with a display section by self light emitting elements, an indicator which is brought to a light emitting state during a wait time, a display section light emission drive device for driving and allowing the display section to emit light, and an indicator light emission drive device for driving and allowing the indicator to emit light, characterized in that a self light emitting element constituting the indicator and at least a part of the self light emitting elements constituting the display section are formed on a same substrate.

2. The self light emitting display device according to claim 1, characterized in that the self light emitting element constituting the indicator is used both as the indicator and a part of the light emitting elements constituting the display section.

3. The self light emitting display device according to claim 1, characterized in that the indicator light emission drive device is formed on a same substrate as that of the display section light emission drive device by a same manufacturing process.

4. The self light emitting display device according to claim 2, characterized in that the indicator light emission drive device is formed on a same substrate as that of the display section light emission drive device by a same manufacturing process.

5. The self light emitting display device according to any one of claims 1 to 4, characterized in that the indicator light emission drive device is constructed so as to operated independently of the display section light emission drive device.

6. The self light emitting display device according to claim 1 or 2, characterized in that the indicator light emission drive device is constituted by a part of the display section light emission drive device.

7. The self light emitting display device according to any one of claims 1 to 4, characterized in that the indicator and at least a part of self light emitting elements constituting the display section are constituted by organic EL elements in which an organic compound is employed in a light emitting layer.

8. The self light emitting display device according to claim 5, characterized in that the indicator and at least a part of self light emitting elements constituting the display section are constituted by organic EL elements in which an organic compound is employed in a light emitting layer.

9. The self light emitting display device according to claim 6, characterized in that the indicator and at least a part of self light emitting elements constituting the display section are constituted by organic EL elements in which an organic compound is employed in a light emitting layer.

* * * * *